United States Patent [19]

Gambon

[11] 4,418,946
[45] Dec. 6, 1983

[54] QUICK ACTING COUPLER

[76] Inventor: Thomas F. Gambon, 12815 Greenville La., St. Louis, Mo. 63141

[21] Appl. No.: 232,166

[22] Filed: Feb. 6, 1981

[51] Int. Cl.³ ............................................. F16L 37/24
[52] U.S. Cl. ..................................... 285/73; 285/158; 285/423; 339/49 B
[58] Field of Search ....................... 285/74, 73, 76, 79, 285/396, 161, 158, 423, 205, 209; 339/48, 49 B, 187, 188, 119 R, 127 R

[56] References Cited

U.S. PATENT DOCUMENTS

| Re. 20,032 | 7/1936 | Douglas | 339/127 R X |
|---|---|---|---|
| 1,278,850 | 9/1918 | Campbell | 339/49 B |
| 1,971,578 | 8/1934 | Richardson | 285/73 |
| 2,171,726 | 9/1939 | Howell | 173/363 |
| 2,541,526 | 2/1951 | Lundquist | 287/103 |
| 2,729,798 | 1/1956 | Graham | 339/47 |
| 2,745,076 | 5/1956 | Kolstad | 339/47 |
| 3,041,005 | 6/1962 | Wallace | 242/116 |
| 3,094,364 | 6/1963 | Lingg | 285/161 X |
| 3,606,195 | 9/1971 | Freeman et al. | 242/118.7 |
| 3,642,223 | 2/1972 | Feichtinger | 242/71.8 |
| 3,645,562 | 2/1972 | Fandetti | 285/73 |
| 3,966,139 | 6/1976 | Terpak | 242/118.7 |
| 4,045,107 | 8/1977 | Sutherland | 339/48 |
| 4,068,808 | 1/1978 | King | 242/118.7 |

FOREIGN PATENT DOCUMENTS

| 21574 | 5/1905 | Austria | 285/73 |
|---|---|---|---|
| 883008 | 11/1961 | United Kingdom | 285/73 |

Primary Examiner—Dave W. Arola
Attorney, Agent, or Firm—Polster, Polster and Lucchesi

[57] ABSTRACT

A quick acting coupler including a pair of identical connector members which axially interfit with one another and which are positively drawn together when rotated through a portion of a revolution thereby to transmit axial, shear, and bending loads. The connector members each have a central hub with interfitting axial fingers and grooves. The fingers are provided with flanges which extend radially inwardly. With the connector members in axial interengagement, the fingers of one connector member are received in the axial grooves of the other connector member. Partial flanges are provided on each connector member which cooperate with the flanges upon rotating the connector members relative to one another thereby to positively, axially draw the connector members into end-to-end abutting engagement. In one embodiment, the connector members are shown as bulkhead or panel connectors, in another embodiment the connector members are shown as fluid tubing connectors, and in still another embodiment the connector members are shown as electrical conductor connectors.

3 Claims, 9 Drawing Figures

U.S. Patent  Dec. 6, 1983  4,418,946
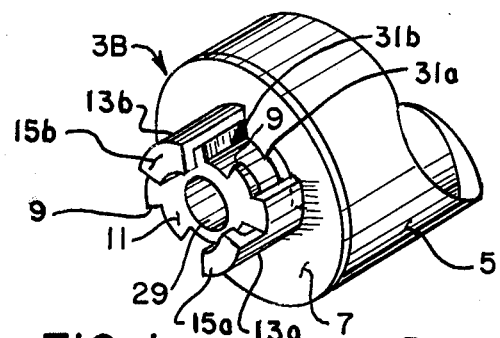
FIG. 1.
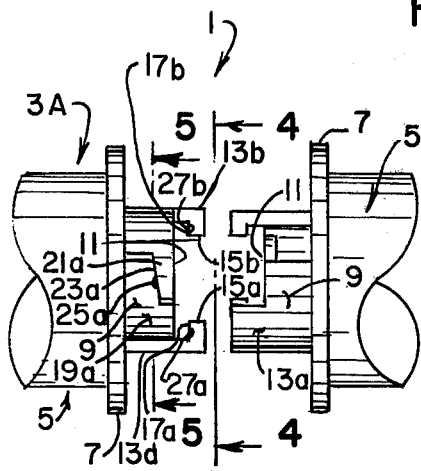
FIG. 2.
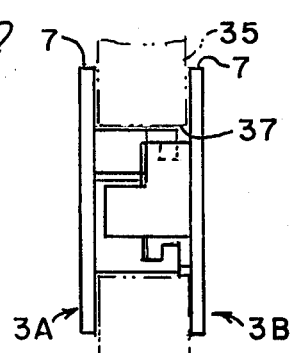
FIG. 3.
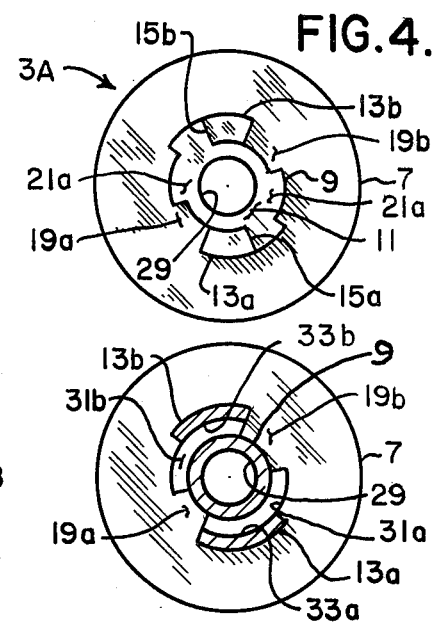
FIG. 4.
FIG. 5.
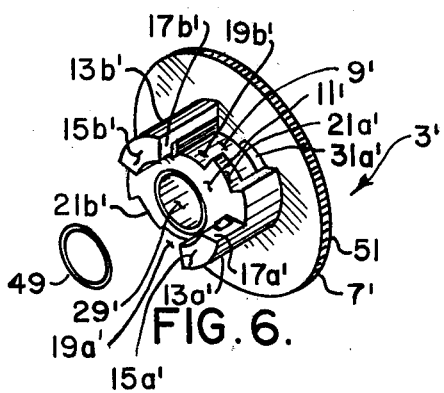
FIG. 6.
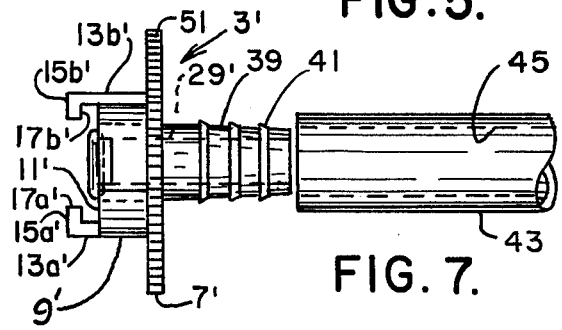
FIG. 7.
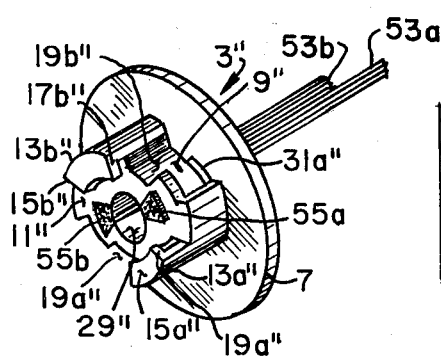
FIG. 8.
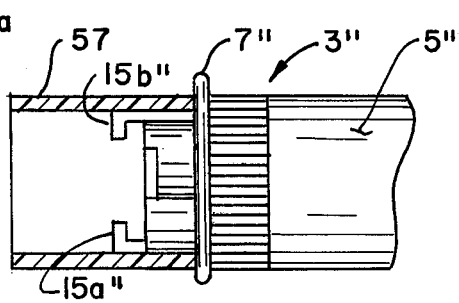
FIG. 9.

QUICK ACTING COUPLER

BACKGROUND OF THE INVENTION

This invention relates generally to a quick acting connector, and more particularly to such a quick acting connector which may be utilized to securely connect two members together in end-to-end abutting relation so as to effectively transmit axial, shear, and bending loads from one member to another.

In many instances, it is highly desirable that one be able to rapidly connect or disconnect two members together. For example, in the manufacture of knock-down furniture, such as prefabricated bookshelves or the like having a plurality of horizontal shelves (referred to as panels or bulkheads) and a plurality of vertical spindles or posts interconnecting the shelves. It is highly desirable that the purchaser of the bookshelf be able to assemble it rapidly without the use of even simple hand tools and, once the bookshelf is assembled, that it have sufficient strength and rigidity to withstand the weight of the books placed on the shelves. In the construction of knock-down furniture, it is often necessary to secure a threaded insert in the shelf and to secure a threaded stud on the end of the post or spindles. Upon assembling the furniture, the stud on the post is threaded into the insert in the shelf. However, this fastening system requires the use of inserts and studs in both on the post and on the shelf.

In other applications, such as in connecting a fluid-carrying plastic used in the intravenous administering of fluids to a patient in the hospital, the fluid tubing was heretofore coupled together by short nipples which were forced into the bore of the plastic tubing. However, in many instances, nurses attempting to connect new lengths of tubing or to connect new intravenous bags to already existing tubing, oftentimes found it difficult to remove the old tubing or bags from the nipple and to connect the new tubing or intravenous bag. Although other types of fluid couplers or quick connect fluid couplers were known, oftentimes these prior fluid couplers would leak.

In still other applications, it is highly desirable that electrical conductors or wires have quick acting connectors attached thereto for making and breaking electric circuits. In connecting electrical conductors, however, it is necessary that good electrical contact be positively maintained by the conductor to prevent arcing. It is also necessary that the connector be adequately insulated to prevent electrical shock.

Reference may be made to such U.S. Pat. Nos. 2,171,726, 2,541,526, 2,729,798, 2,745,076, 3,041,005, 3,966,139, and 4,068,808 which disclose a variety of quick acting couplers in the same general field as the present invention.

SUMMARY OF THE INVENTION

Among the several objects and features of this invention may be noted the provision of a quick acting connector or coupler which is capable of transmitting axial, shear, and bending loads;

The provision of such a quick acting connector which may be molded in one piece utilizing relatively simple pull apart molds;

The provision of a quick acting coupler which has no moving parts;

The provision of a quick acting coupler which may be utilized as a bulk head connector adapted to fit through a bulkhead or panel and to securely fasten another member to the bulkhead in generally prependicular relation to the bulkhead;

The provision of a quick acting connector for rapidly and positively coupling fluid tubing together for the flow of fluid therethrough and for preventing leakage of the fluid;

The provision of a quick acting coupling for rapidly and positively coupling electrical connectors together; and The provision of a quick acting coupler which is relatively simple and inexpensive to manufacture, which is simple to operate, and which positively connects members together.

Other objects and features of this invention will be in part apparent and part pointed out hereinafter.

Briefly stated, a connector of this invention for fastening two objects together comprises a pair of identical connector members adapted to axially interfit with one another when brought into axial interengagement with one another and positively draw one another into secure end-to-end abutting relation when the members are rotated relatively to one another through part of a revolution from an interfit position in which the connector members can be freely axially moved toward and away from one another and a coupling position in which the members are coupled together so as to transmit axial, shear, and bending loads from one coupling member to another. Each of the connecting members has a central hub, this hub having an end face. Each of the connector members further has a pair of arms at opposite sides of the hub projecting axially outwardly beyond the end of the hub, each of these arms having a flange projecting radially inwardly. Further, each of the connector members has a pair of axial grooves in the sidewalls of its central hub with the arms and the grooves being substantially equally angularly spaced around the central hub and alternating on the central hub with one another. The axial grooves are so structured as to receive a respective arm and flange of the other connector member when the two connector members are brought into their interfitting position. The central hub further has a partial flange adjacent each groove facing away from the end of the hub and opening into its respective axial groove. The arms and flanges of one of the connector member are received in the grooves of the other connector member and the arms and flanges of the other connector member are received in the grooves of the one connector member so that the flanges are cammingly engagable with their respective partial flange as the connector members are rotated relative to one another from their stated interfitting position to their coupled position thereby to positively secure the connector members together.

BRIEF OF THE DRAWINGS

FIG. 1 is a perspective view of one of the connector members of the quick acting connector of the present invention installed on an object, such as a spindle or the like;

FIG. 2 is a side elevational view of a pair of identical connector members constituting the quick acting connector of the present invention in axial alignment with one another and spaced axially from one another in an interfitting position so that upon moving the connector members in an axial direction toward one another, the connector members will interfit;

FIG. 3 is a view similar to FIG. 1 in which the connector members have moved axially toward their interfit position and have been rotated through a portion of a revolution from their interfitting position to a coupling position, the connector member fit through the hole in a bulkhead member (shown in phantom) for positively holding the bulk head member captive between flanges carried by the connector members and for positively connecting the objects attached to the connector members together in end-to-end abutting relation;

FIG. 4 is an end elevational view of one of the members taken along line 4—4 of FIG. 2;

FIG. 5 is a cross-sectional view of one of the connector members as taken along line 5—5 of FIG. 2;

FIG. 6 is a perspective view of another embodiment of the connector member of the present invention particularly adapted for use as a fluid tubing connector;

FIG. 7 is a side elevational view of the tubing connector illustrated in FIG. 6;

FIG. 8 is a perspective view of another embodiment of the connector of the present invention for connecting electrical conductors together; and FIG. 9 is a side elevational view of the electrical connector shown in FIG. 8 with an insulator hood (shown in cross section) fitted over a portion of the connector.

Corresponding reference characters indicate corresponding parts throughout the several views of the drawings.

DESCRIPTION OF PREFERRED EMBODIMENTS

Referring now to the drawings, a quick acting connector system of this invention is indicated in its entirety by reference character 1 (see FIG. 1). The connector system includes the two identical connector members, as indicated generally as 3A, 3B, which are adapted to axially interfit with one another when brought into axially interengagement with one another and to positively draw one another into secure end-to-end abutting relation when the two connector members are rotated relative to one another through part of a revolution from an interfit position (FIG. 2) to a coupling position (FIG. 3).

As best shown in FIGS. 1-3, each connector member 3A, 3B is shown to be secured to the end of an object 5, such as a spindle or a post which may be used in the construction of a bookcase or other article of furniture. The connector members 3A, 3B are identical and are so constructed that they cooperate with one another to interfit and to couplingly engage one another. Each connector member is a one-piece member preferably molded of suitable metal alloy or synthetic resin material, depending on the application for the connector. Each connector member includes a base flange or shoulder 7 and a central hub 9 extending axially outwardly from the base flange. For example, connector 3A, 3B may be secured (stapled or screwed) onto the end of post 5 by staples or screws (not shown) inserted through flange 7 into the end of the post. Alternatively, connector 3A, 3B may be integrally molded with object 5 of a suitable synthetic resin material and may have any desired decorative finish applied thereto.

Hub 9 has an end face 11 with pairs of arms 13a, 13b on opposite sides of the hub extending axially outwardly beyond end face 11. Each arm 13a, 13b has a respective flange 15a, 15b extending radially inwardly toward one another and spaced out beyond end face 11. Each flange 15a, 15b has a respective inner face 17a, 17b for purposes as will hereinafter appear. Further, hub 9 includes a pair of diametrically opposed axial grooves 19a, 19b (see FIGS. 4 and 5) extending from end face 11 of the hub to flange 7. On each connector member, flanges 13a, 13b and axial grooves 19a, 19b alternate with one another and are spaced at substantially equal angular intervals around the hub.

Further, each connector member 3A, 3B includes a partial flange 21a, 21b adjacent a respective axial groove 19a, 19b with the outer face of the partial flange being substantially coplanar with end face 11 of central hub 9. Each partial flange has a respective innerface, as indicated at 23a, 23b in FIG. 2, facing toward flange 7, and each partial flange 21a, 21b has a respective protrusion 25a, 25b formed on its innerface 23a, 23b. Also, each flange 15a, 15b has respective detent depression or dimple 27a, 27b formed in flange face 17a, 17b. Further, each connector member has a central axial passage or hole 29 extending therethrough.

In accordance with this invention, it is preferred that each of the connector members 3A, 3B be so constructed that it is capable of being molded as a one-piece unit in a relatively simple, pull apart mold thus eliminating the necessity of having complex movable cores in the mold. This, of course, substantially lessens production costs for the connector of this invention. To accomplish this, a pair of part circular openings or slots 31a, 31b (see FIG. 5) on opposite sides of central hub 9 extend through flange 7 and permit mold parts (not shown) to form the inner surfaces 33a, 33b of flanges 13a, 13b, respectively. These mold parts extend axially through slots 31a and 31b and also form innerfaces 17a, 17b of flanges of 15a, 15b and detent recesses 27a, 27b therein. Still further, these mold parts extend through slots 31a and 31b form inner flange faces 23a, 23b of respective partial flanges 21a, 21b and detent protrusions 25a, 25b. It will be understood that, after connector member 23 has been molded, the mold can be opened and the molded connector member may be axially withdrawn from the mold parts which fit through openings 31a, 31b.

As shown in FIG. 2, with connector members 3A, 3B in axial alignment with one another and with the connector members angularly oriented with respect to one another so that the axial grooves 19a, 19b of one of the connector members are in alignment with the arms 13a, 13b of the other connector, the connector members may be moved axially toward one another from the position shown in FIG. 2 to an interengagement or interfit position in which the arms 13a, 13b of one of the connector members are received in the axial grooves 19a, 19b of the other connector members. Then, the connector members are rotated in opposite directions relative to one another through a part of a revolution so that flanges 15a, 15b of arms 13a, 13b move angularly out of their respective axial grooves 19a, 19b into a position below partial flanges 21a, 21b. As the flanges are rotated relative to one another, flange faces 17a, 17b cooperate with their respective partial flange faces 23a, 23b thereby to draw the end face 11 of the two connector members into firm end-to-end abutting relation. As the connector members are rotated relative to one another, detent protrusions 25a, 25b are adapted to be received in detent depressions 27a, 27b thereby to securely hold the connector members in their coupled position in which the connector members may readily transmit axial, shear, and bending loads. Of course, to uncouple or unlock the connector members, the connector members are rotated relative to one another in opposite direction and are then pulled axially apart.

It will be understood that, as shown in FIG. 2, the innerfaces 17a, 17b of flanges 15a, 15b and the cooperating partial flange faces 23a, 23b may be formed at a slight angle to a radial plane of the longitudinal center line so as to have a predetermined pitch whereby upon rotating the connector members from their interengagement to their coupled position, the connector members are positively drawn into firm axial end-to-end abutting relation with one another.

The connector members shown in FIGS. 1-5 are particularly well suited to be a bulkhead connector. As shown in FIG. 3, a bulkhead, as indicated at 35, is provided with a hole or aperture 37 therethrough. The central hub 9 of each of the connector members 3A and 3B is of such length that when the connector members are coupled together in their coupled position, as shown in FIG. 3, the distance between the innerfaces of flanges 7 of the two connector members is such that the innerfaces of the flanges firmly engage the outer faces of bulkhead 35. Also, the diameter of hole 37 in bulkhead 35 is such as to readily but snugly receive the central hubs 9 of the connector members. In this manner, the connector members are rigidly secured to the bulkhead and are capable of transmitting axial thrust loads to and from the bulkhead, and, because of the relatively tight fit between the central hub 9 and hole 37 in the bulkhead, lateral movement of the bulkhead fitting relative to the bulkhead is substantially limited.

As those skilled in the art will appreciate, the provision of such bulkhead fittings may have many specific applications. As one example, such bulkhead fittings may be useful in the construction of furniture articles, such as bookshelves, in which a bulkhead 35 would constitute a horizontal shelf and in which the objects 5 to which connector members 3A and 3B are secured would constitute the vertical supports or spindles between the shelves. Bookshelves constructed in this manner could thus be shipped in a knocked down configuration and could be readily assembled by the consumer without the necessity of even simple hand tools.

Referring now to FIGS. 6 and 7, another embodiment of the connector of this invention is generally indicated by reference character 3'. This connector is particularly adapted for coupling fluid hoses or tubing together for flow of fluid (e.g., intravenous liquids in medical applications, or air in fluidic or pneumatic control circuits in industrial applications) therethrough and for prviding the quick make and break connections of the fluid hoses or tubes. It will be appreciated that the construction and operation of the fluid connector 3', as illustrated in FIGS. 6 and 7, is essentially similar to that for connector 1 heretofore described and thus parts having a similar construction and function will be indicated by "primed" reference characters.

As shown best in FIG. 7, connector member 3' has a tapered nipple 39 extending from the backface of flange 7', and the nipple has a plurality of outwardly extending circumferential ridges 41 formed thereon. The end of a length of flexible tubing or hose 43 is illustrated in FIG. 7. Tubing 43 has an innerbore 45 and this innerbore is of such diameter that nipple 39 is adapted to be forced into the bore. Ridges 41 are so sized as to make a leak tight, force fit connection with the tubing.

In addition, connector member 3' has a circular groove 47 formed on its end face 11' surrounding axial hole 29 extending through the connector member and through nipple 41. Of course, it will be understood that fluid flowing through tubing 43 is also free to flow through central bore 29' of connector member 3'. In accordance with this invention, an O-ring 49 is adapted to be received and held in place within a circumferential groove 47 on the end face 11' of connector member 3' surrounding hole 29'. When the connector member 3' is brought into its interengagement position with another connector member in a manner similar to connector members 3A and 3B as described above, and when the connector members 3' are rotated through a part of a revolution from their interengagement to their coupled positions, O-ring 49 will be compressed in its groove 47 as the connector members are positively drawn into end-to-end abutting relation. This in turn makes a leak tight connection between the connector members and permits the flow of fluid from one length of tubing 43 to the tubing attached to the other connector member (not shown). Also, it will be appreciated that the periphery of flange 7' may be knurled, as indicated at 51, to aid in the gripping of the flange to make and break the leak tight fluid connection.

In FIGS. 8 and 9, still another embodiment of the connector of the present invention as shown. This other connector, as generally indicated at 3'', is particularly adapted for use in making electrical connection between one or more electrical conductors 53a, 53b to another set of corresponding electrical connectors (not shown) coupled to another connector member 3'' in a manner similar to connectors 3A, 3B described above. As shown in FIG. 8, each of the conductors 53a, 53b is electrically connected to a respective contact surface 55a, 55b provided on end face 11'' of connector member 3''. Of course, it will be appreciated that connector member 3'' is preferably molded of a suitable electrical insulation material and thus the contact areas 55a, 55b are electrically isolated from one another.

It will be appreciated that when electrical connector member 3'' is coupled to a like electrical connector 3'' in a manner similar to that described above in regard to connector members 3A, 3B, connector surfaces 55a, 55b of each of the electrical connector member 3'' are in face-to-face abutting electrical connection with one another whereby the conductors 53a, 53b of one connector member are in positive electrical contact with the mating electrical conductors of the other connector member.

As illustrated in FIG. 9, an insulator hood 57 may be provided on flange 7'' of electrical connector member 3'' to extend out beyond flanges 15a'', 15b'' so as to electrically insulate the central hub and the contact surfaces 55a, 55b. In addition, electrical connector 3'' is shown to be positively secured to a end of an electrical cable 59 which includes conductors 53a, 53b. It will be appreciated that while connector 3'' shows two electrical conductors 53a, 53b, the connector may include one or more than two connectors by appropriately spacing the contact faces 55a, 55b at desired equal angular intervals around central hole 29'' in central hub 9'' so as to mate with corresponding patterns of connector surfaces on the mating electrical connector 3'' (not shown).

In view of the above, it will be seen that the several objects and features of this invention are achieved and other advantageous results obtained.

As various changes could be made in the above constructions without departing from the scope of the invention, it is intended that all matter contained in the above description or shown in the accompanying drawings shall be interpreted as illustrative and not in a limiting sense.

What is claimed is:

1. A connector for coupling two objects together and for transmitting axial, shear, and bending loads between the objects, said connector comprising a pair of identical connector members, one for each said object, each of said connector members being a one piece member capable of being molded in a pull apart mold, each said connector member having a base, a hub projecting axially outwardly from said base, said hub having an end face, a pair of arms integral with said base on on generally diametrically opposed sides of the hub extending out beyond the end face of the hub, each of said arms having a flange projecting radially inwardly, and a pair of grooves in the side of the hub, said arms and grooves alternating with one another and being substantially equally angularly spaced relative to one another around the hub, said hub further having a partial flange adjacent the end face of the hub and closing off a portion of each of said axial grooves and having a gap of sufficient distance between the end of the partial flange and the opposite side of the groove to permit said arm and flange of the other connector member to be axially received therein as the connector members are moved axially relative to one another into an interfit position in which said flanges and arms of both of said connector members are received in said axial grooves of the other connector members, said flanges and partial flanges having cooperable surfaces thereon which are cammingly engagable with one another upon rotation of said connector members relative to one another from their interfit position to a coupled position so as to axially draw said connector members together, said base having a pair of part circular openings therethrough adjacent said hub on opposite sides thereof, each of said part circular openings spanning an arc substantially similarly to the arc spanned by its respective flange and partial flange enabling a straight through mold part to form portions of said flanges, said partial flanges, and said axial grooves.

2. A connector as set forth in claim 1 wherein said cooperable surfaces of said flanges and said partial flanges are inclined relative to the longitudinal axes of said connector members so that upon rotating said connector members from their interfitting to their coupled positions, said connecting members are positively drawn together in end-to-end abutting relation.

3. A connector as set forth in claim 1 wherein said connector members are bulkhead connectors, said bulkhead being of a predetermined thickness and having a hole therethrough, each connector member including a shoulder, said central hub extending axially outwardly from said shoulder, said central hub of each of said connector members being insertable in said bulkhead hole from an opposite side of said bulkhead, said shoulders being engagable with said bulkhead on opposite sides thereof and being drawn onto said bulkhead as said connector members are rotated relative to one another to their coupled positions.

* * * * *